March 4, 1952 A. S. NEWTON 2,588,153
METHOD OF MAKING METAL HYDRIDE
Filed March 4, 1947
Witness:
John A. Horan
INVENTOR.
Amos S. Newton
BY
ATTORNEY Patented Mar. 4, 1952

2,588,153

UNITED STATES PATENT OFFICE 2,588,153

METHOD OF MAKING METAL HYDRIDE

Amos S. Newton, Berkeley, Calif., assignor to the United States of America as represented by the United States Atomic Energy Commission Application March 4, 1947, Serial No. 732,257

3 Claims. (Cl. 23—14.5)

This invention relates to hydrides of the heavy metals and more specifically to uranium hydrides and to methods of producing such hydrides.

In this specification and claims the word "hydride," unless otherwise indicated, designates generically the isotopic hydrogen anions of mass 1, 2, or 3.

Prior to the present invention other processes have been suggested for the production of heavy metal hydrides. For example, U. S. Letters Patent granted to Frank H. Driggs, No. 1,816,830, August 4, 1931, describes a process in which powdered uranium metal is introduced into a hermetically sealed container, the container evacuated and the powder degasified, and subsequently this degasified powder is reacted with hydrogen at a temperature between 225° C. and 450° C., and pressures less than atmospheric, to form uranium hydride. This process has been open to several objections. For example, the amount of air and other gases adsorbed by the powder is substantial and in consequence, a considerable period of degasification has been necessary in order to secure proper reaction. Furthermore, since hydrogen tends to react with powdered uranium spontaneously with evolution of much heat, the reaction is stated to be difficult to control, and may even become explosively violent. In addition, the product formed is a finely divided, crystalline form, having a low bulk density, thus making it unsuitable for certain uses.

Recognizing the objections to this process, Driggs proposed an improvement in U. S. Letters Patent No. 1,835,024, granted December 8, 1931. In this patent, Driggs pointed out that the necessary degasification of metallic powder materially increases the cost of manufacture and suggested a step by step process of formation of the hydride. In accordance with this process, uranium powder was sintered to form an essentially coherent solid body of uranium and this body was subjected to hydrogen under a pressure of about 150 mm. of mercury in a closed container, at a temperature of about 225° C. Uranium hydride formed as a coating upon the surface of the sintered uranium until the surface became completely coated whereupon reaction ceased. Thereafter the coated uranium was subjected to a temperature of about 450° C. to cause decomposition of the hydride and formation of uranium metal in powdered state which fell to the bottom of the reaction chamber exposing fresh uranium surface of the coherent uranium mass. Hydrogen was again introduced into the reactor, and the powdered metal hydrogenated to form uranium hydride which was withdrawn from the reactor. The two step process was repeated as often as was required to convert the sintered uranium body to uranium hydride. It is apparent that this process offers certain complications due to the fact that a two stage operation is necessary thus materially decreasing the rate of formation of uranium hydride and increasing the cost of the process. The Driggs processes and, as far as I know, other prior art processes are open to the general objection that the hydride produced by these processes is a finely divided crystalline hydride which has a low bulk compressibility and is by reason of these objections unsuitable for certain uses. The hydride produced by these processes is a brownish black or brownish gray pyrophoric powder with most of the hydride particles so small that they will pass readily through a 400 mesh sieve as well as silk bolting cloth. It has been found that this crystal size is characteristic of hydrides made by these methods. Numerous unsuccessful attempts have been made to increase the compressibility of this powdered hydride by pressing or by increasing the crystal size. The hydride has been heated to 600° C. under pressures of 1800 lbs. per square inch of hydrogen without changing the nature or size of the crystals. Compressibility tests with a range of as much as 162 tons per square inch have failed to show any discontinuity in the pressure-density curve, indicating that there is no change in the crystal structure up to this pressure. At pressures of 100 tons per square inch, the increase of bulk density has been found to give bulk densities of less than 8 grams per cc. It is believed that it would be highly desirable that hydrides of heavy radioactive metals such as uranium and plutonium be used in neutronic reactors but because of the low bulk compressibility of the hydrides as they have been made in the past, these metal compounds have not been considered to be a suitable material for use in neutronic reactors designed to produce fissionable materials. It is therefore desirable that uranium hydride of higher bulk compressibility than is possible under present methods be obtained.

An object of this invention is to provide a crystalline hydride of a heavy metal comprising crystals of larger size and higher bulk compressibility than are present in hydrides made by prior art processes.

An additional object of this invention is to provide a hydride of a heavy radioactive metal such as uranium or plutonium, of large crystal size and high bulk compressibility suitable for use in a neutronic reactor.

A further object of this invention is to provide a method for the production of hydrides of heavy metals, of large crystal size and high bulk density.

In accordance with this invention a crystalline hydride of a heavy metal, of large crystal size and high bulk density is obtained by the hydrogenation of a heavy metal under greater than atmospheric pressures, desirably above 1000 lbs. per square inch, and preferably above 1800 lbs. per square inch and temperatures of the order of 500° to 700° C. For example, by the process of this invention, a uranium hydride may be prepared with large crystal size of the order of ¼ inch and with high bulk compressibility. An illustration of uranium hydride crystals made by the process of this invention under 1800 lbs. per square inch pressure and 600° C. temperature is shown in Figure 1. This is a reproduction of a photograph of such crystals with a magnification factor of 60. The large crystals formed by the process of this invention are characteristically different from the crystals formed by the ordinary processes of hydride formation. Thus when the high pressure form of hydride is decomposed by heating, it retains its form and does not sinter together as does the ordinary hydride under the same treatment. This characteristic crystal pattern is also readily apparent in the increased sharpness of X-ray diffraction patterns which these crystals exhibit. The density of the hydrogen atoms in crystals of uranium hydride formed by the process of this invention is as great as their density in liquid hydrogen. The advantage of hydride crystals produced by this process is especially apparent in the deuteride and triteride. The atomic spacing in uranium deuteride is less than that in the hydride thus giving an increase in density even beyond that normally to be expected from the greater weight of deuterium. The fundamental difference between the hydrides produced by older methods, and by this process is in the difference in compressibility. Compressibility tests were made on uranium hydride produced by the process of this invention under pressures of 1850 lbs. per square inch and uranium hydride produced by the older methods at atmospheric pressure. Both hydrides were compressed under 100 tons per square inch and the density of the compressed blocks calculated from the weight and dimensions. The uranium hydride produced by the process of this invention showed a density of 9.1 while the hydride produced by the older method had a density of 7.9. Because of this much greater bulk compressibility, uranium hydrides, deuterides and triterides made by the process of this invention are considered particularly suitable for use in various neutronic reactors whereas the uranium hydride as made by the normal processes are not considered to be as suitable for use in certain neutronic reactors.

An apparatus which has been found to be suitable for the preparation of heavy metal hydrides by the process of this invention consists fundamentally of a closed reaction chamber, a means for heating the reaction chamber, and a container suitable for holding the metal or metal compound from which the hydride is to be formed, during the reaction.

The hydrides of heavy metals, of large crystal size and high compressibility may be produced by the process of this invention by placing said metal in a suitable container, which is in turn placed in a closed reaction chamber. The metal is raised to elevated temperatures of the order of 500° to 700° C., and hydrogen under pressures greater than atmospheric is introduced into the reaction chamber.

The process of this invention may be used to produce the hydrides of such heavy metals as thorium, palladium, uranium, and the transuranic metals, but it has been found especially useful in producing the hydride of uranium. The metal used may be in massive form, but it has been found preferable to use particles or turnings of massive uranium having a mass of about 1 to 5 grams. Powdered metal may also be used, but because of the pyrophoric characteristics of certain of the heavy metals when finely divided, special precautions must be taken to prevent explosive oxidation with such powdered metals, and it has been found preferable to use less finely divided metal. The metal used in the process of this invention may be of high purity or may be physically mixed, or contaminated, or alloyed with other materials such as tin, copper, bismuth, aluminum, silver or gold. For example, uranium alloys with these metals or uranium containing these metals in dendrite form, preferably wherein the uranium is in the preponderant concentration, may be treated in accordance with this invention.

While uranium hydride may be formed by the process of this invention at atmospheric pressure and a suitable temperature, in excess of 435° C., it has been found that the compressibilty of the resulting hydride increases in proportion to the pressure of hydrogen under which the hydride is formed. Thus it has been found desirable to conduct the reaction at pressures greater than 1000 lbs. per square inch, and preferably above 1800 lbs. per square inch. The temperature at which the reactions may be carried out, will vary with the heavy metal used, and the pressure under which it is formed. For example, with uranium it has been found that at atmospheric pressure, a temperature of 435° C. will permit the hydride to form. Above atmospheric pressure however, the temperature required for the reaction goes up very slowly, and it has been found that for uranium hydride, the reaction will proceed at temperatures between 500° and 700° C. for pressures as high as 2000 lbs. per square inch. Because of the high temperatures and pressures used and the exothermic character of the reaction it is desirable to limit the quantities of materials to be reacted in any one operation, and to have a considerable safety factor in the reaction chamber used.

The reaction should be preferably carried out in a reaction chamber from which oxygen, air and other impurities have been substantially excluded. This may be accomplished, by placing the heavy metal reactant in the reaction chamber and producing a vacuum in the chamber, or by sweeping out the chamber with hydrogen, or one of the inert gases. The metal may be heated by any suitable means such as a reaction coil or furnace. The metal may be brought to the desired reaction temperature, either in a vacuum, an atmosphere of inert gas, or a hydrogen atmosphere at the pressure at which the reaction is to be carried out. However, it has been found preferable to heat the metal to the desired temperature in vacuo or an atmosphere of inert gas, and then introduce the hydrogen at the desired pressure. Because of the fairly high decomposition pressures of hydrides at the elevated temperature at which the reaction is carried out, it is desirable to permit the hydride to cool under the pressure at which the reaction is carried out.

The hydride produced by this method may be pressed by any conventional pressing method to form blocks of much greater bulk density than can be formed by pressing hydrides produced by prior processes. Thus uranium hydride produced by the process of this invention under a pressure of 1850 lbs. per square inch of hydrogen, at 600–700° C., and formed into blocks under a pressure of 100 tons per square inch has a bulk density of 9.1 grams per cc. Pressed uranium hydride of this density is particularly suitable for use in neutronic reactors.

A suitable apparatus for the production of heavy metal hydrides by the process of this invention at pressures up to 200 lbs. per square inch was prepared in the following manner: A pressure bomb 11 inches deep, with ¼-inch walls and 3-inch internal diameter was constructed. A 2-inch flange 11 inches in diameter was welded on top, and a cover was constructed of 1-inch thick steel plate, 11 inches in diameter, held in place with eight ¾-inch bolts through the two flanges. A well annealed copper gasket fits into a V-slot in the flange. Electrical leads and thermocouple wires are introduced through four spark plugs in the top. Heat insulation within the bomb was provided by using concentric nickel sheeting held apart by beryllia spacers. The heating means provided was a coil of 0.020-inch molybdenum wire wrapped around a threaded beryllia crucible. When the apparatus was used for the production of uranium hydride, the uranium metal was placed in a uranium nitride crucible around which small pieces of uranium were packed as a "getter" for gases coming out of the beryllia.

Although the present invention has been described with particular reference to certain of the specific details of certain embodiments thereof, it is not intended that such details shall be regarded as limitations upon the scope of the invention, except insofar as included in the accompanying claims.

What is claimed is:

1. A process for the production of a hydride of a heavy metal, of high bulk compressibility which comprises subjecting a heavy metal at a temperature of 500° to 700° C. to the action of hydrogen under a pressure of at least 1800 lbs. per square inch.

2. A process for the production of uranium hydride of high bulk compressibility which comprises subjecting uranium metal at a temperature of 500° to 700° C. to the action of hydrogen under a pressure of at least 1800 lbs. per square inch.

3. A process for the production of uranium hydride of high bulk density which comprises subjecting metallic uranium at a temperature of 500° to 700° C. to the action of hydrogen under a pressure of greater than 1000 lbs. per square inch and compressing the resulting crystalline uranium hydride under a pressure of the order of 75 to 175 tons per square inch.

AMOS S. NEWTON.

REFERENCES CITED

The following references are of record in the file of this patent:

UNITED STATES PATENTS

| Number | Name | Date |
|---|---|---|
| 1,816,830 | Driggs | Aug. 4, 1931 |
| 1,835,024 | Driggs | Dec. 8, 1931 |